US011436288B1

United States Patent
Mass et al.

(10) Patent No.: US 11,436,288 B1
(45) Date of Patent: Sep. 6, 2022

(54) QUERY PERFORMANCE PREDICTION FOR MULTIFIELD DOCUMENT RETRIEVAL

(71) Applicant: INTERNATIONAL BUSINESS MACHINES CORPORATION, Armonk, NY (US)

(72) Inventors: Yosi Mass, Ramat Gan (IL); Haggai Roitman, Yoknea'm Elit (IL); Guy Feigenblat, Givataym (IL); Roee Shraga, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 17/202,646

(22) Filed: Mar. 16, 2021

(51) Int. Cl.
G06F 7/02 (2006.01)
G06F 16/00 (2019.01)
G06F 16/93 (2019.01)
G06K 9/62 (2022.01)
G06F 16/22 (2019.01)
G06N 5/00 (2006.01)

(52) U.S. Cl.
CPC .......... G06F 16/93 (2019.01); G06F 16/2228 (2019.01); G06K 9/6215 (2013.01); G06N 5/003 (2013.01)

(58) Field of Classification Search
CPC ... G06F 16/93; G06F 16/2228; G06K 9/6215; G06N 5/003
See application file for complete search history.

(56) References Cited

U.S. PATENT DOCUMENTS

| 9,613,319 | B1 | 4/2017 | Yu |
| 10,698,908 | B2 | 6/2020 | Cohen |
| 2019/0026279 | A1* | 1/2019 | Roitman ................ G06N 20/00 |
| 2020/0210489 | A1 | 7/2020 | Roitman |

OTHER PUBLICATIONS

Collins-Thompson, Kevyn et al, "Predicting Query Performance via Classification", Proceedings of the 32nd Annual European Conference on Information Retrieval (ECIR 2010), Mar. 2010, retrieved Jun. 14, 2022 from http://www.cs.cmu.edu/~pbennett/papers/ecir-2010-qclass.pdf (Year: 2010).*

(Continued)

Primary Examiner — Bruce M Moser
(74) Attorney, Agent, or Firm — Robert R. Aragona (57) ABSTRACT

An embodiment for predicting a performance of a query in retrieving multifield documents is provided. The embodiment may include receiving a query from a user. The embodiment may also include retrieving a list of multifield documents from a corpus of documents in response to the query. The embodiment may further include generating a pseudo-effective (PE) reference-list for each field in the corpus of documents. The embodiment may also include executing one or more existing query performance prediction (QPP) methods on the retrieved list and each generated PE reference-list. The embodiment may further include deriving one or more extended QPP methods. The embodiment may also include estimating a performance of the query in obtaining the retrieved list of multifield documents based on the one or more extended QPP methods.

20 Claims, 5 Drawing Sheets

(56) References Cited

OTHER PUBLICATIONS

Bhagavatula et al, "Methods for Exploring and Mining Tables on Wikipedia," IDEA '13: Proceedings of the ACM SIGKDD Workshop on Interactive Data Exploration and Analytics, Aug. 2013, https://doi.org/10.1145/2501511.2501516, pp. 18-26.

Carmel et al., "SIGIR 2012 Tutorial: Query Performance Prediction for IR," SIGIR'12, Aug. 12-16, 2012, ACM 978-1-4503-1472-5/12/08, pp. 1196-1197.

Cronen-Townsend et al., "Predicting Query Performance," SIGIR '02: Proceedings of the 25th annual International ACM SIGIR conference on Research and development in information retrieval, Aug. 2002, https://doi.org/10.1145/564376.564429, pp. 299-306.

Grace Period Disclosure, "Query Performance Prediction for Multifield Document Retrieval," Haggai Roitman, Yosi Mass, Guy Feigenblat, Roee Shraga, ICTIR '20, Sep. 14-17, 2020, Virtual Event, Norway, pp. 49-52.

Markovits et al., "Predicting Query Performance for Fusion-Based Retrieval," CIKM '12: Proceedings of the 21st ACM international conference on Information and knowledge management, Oct. 2012, https://doi.org/10.1145/2396761.2396865, pp. 813-822.

Mell et al., "The NIST Definition of Cloud Computing", National Institute of Standards and Technology, Special Publication 800-145, Sep. 2011, 7 pages.

Roitman et al., "Enhanced Mean Retrieval Score Estimation for Query Performance Prediction," ICTIR '17, Oct. 1-4, 2017, DOI: https://doi.org/10.1145/3121050.3121051, pp. 35-42.

Roitman et al., "Enhanced Performance Prediction of Fusion-based Retrieval," ICTIR'18, Sep. 14-17, 2018, https://doi.org/10.1145/3234944.3234950, pp. 195-198.

Roitman et al., "Robust Standard Deviation Estimation for Query Performance Prediction," ICTIR'17, Oct. 1-4, 2017, DOI: https://doi.org/10.1145/3121050.3121087, pp. 245-248.

Roitman, "An Enhanced Approach to Query Performance Prediction Using Reference Lists," SIGIR '17: Proceedings of the 40th International ACM SIGIR Conference on Research and Development in Information Retrieval, Aug. 2017 https://doi.org/10.1145/3077136.3080665, pp. 869-872.

Shtok et al., "Predicting Query Performance by Query-Drift Estimation," ACM Transactions on Information Systems, vol. 30, No. 2, Article 11, Publication date: May 2012, http://doi.acm.org/101145/2180868.2180873, 35 pages.

Shtok et al., "Query Performance Prediction Using Reference Lists," ACM Trans. Inf. Syst. 34, 4, Article 19 (Jun. 2016), DOI: http://dx.doi.org/10.1145/2926790, 34 pages.

Vinay et al., "On Ranking the Effectiveness of Searches," SIGIR '06: Proceedings of the 29th annual international ACM SIGIR conference on Research and development in information retrieval, Aug. 2006, https://doi.org/10.1145/1148170.1148239, pp. 398-404.

Webber et al., "A Similarity Measure for Indefinite Rankings," ACM Transactions on Information Systems, vol. 28, No. 4, Article 20, Publication date: Nov. 2010, http://doi.acm org/10.1145/1852102.1852106, 38 pages.

Yom-Tov et al., "Learning to Estimate Query Difficulty: Including Applications to Missing Content Detection and Distributed Information Retrieval," SIGIR '05: Proceedings of the 28th annual international ACM SIGIR conference on Research and development in information retrieval, Aug. 2005, https://doi.org/10.1145/1076034.1076121, pp. 512-519.

Zendel et al., "Information Needs, Queries, and Query Performance Prediction," SIGIR '19, Jul. 21-25, 2019, https://doi.org/10.1145/3331184.3331253, pp. 395-404.

Zhang et al., "Ad Hoc Table Retrieval using Semantic Similarity," arXiv:1802.06159v3 [cs.IR] Mar. 8, 2018, Retrieved from the Internet: <https://arxiv.org/pdf/1802.06159.pdf>, 10 pages.

Zhou et al., "Query Performance Prediction in Web Search Environments," SIGIR 2007 Proceedings, Session 23 Web IR II, Jul. 23-27, 2007, pp. 543-550.

Zhou et al., "Ranking Robustness: A Novel Framework to Predict Query Performance," CIKM '06: Proceedings of the 15th ACM international conference on Information and knowledge management, Nov. 2006, https://doi.org/10.1145/1183614.1183696, pp. 567-574.

\* cited by examiner

QUERY PERFORMANCE PREDICTION FOR MULTIFIELD DOCUMENT RETRIEVAL

STATEMENT REGARDING PRIOR DISCLOSURES BY THE INVENTOR OR A JOINT INVENTOR

The following disclosure(s) are submitted under 35 U.S.C. § 102(b)(1)(A): DISCLOSURE(S): [Query Performance Prediction for Multifield Document Retrieval, Haggai Roitman et al., Published Sep. 14, 2020, 4 pages]

BACKGROUND

The present invention relates generally to the field of computing, and more particularly to a system for predicting the performance of a query in retrieving multifield documents.

Information Retrieval (IR) is the process of obtaining information system resources that are relevant to an information need from a large collection of those resources. Such resources may include books, journals, and other documents stored in a database. Query performance prediction (QPP) is a core IR task to estimate retrieval effectiveness in the absence of relevance judgments, i.e., human intervention. In many real-world retrieval settings, retrievable documents may be composed of several different fields on which a query is being evaluated, such as title, authors, related work, and question and answer (Q&A) fields. These fields are useful to evaluate in that they may contain the information which a user is seeking.

SUMMARY

According to one embodiment, a method, computer system, and computer program product for predicting a performance of a query in retrieving multifield documents is provided. The embodiment may include receiving a query from a user. The embodiment may also include retrieving a list of multifield documents from a corpus of documents in response to the query. The retrieved list may be obtained by searching the query over multiple fields in the corpus of documents. The embodiment may further include generating a pseudo-effective (PE) reference-list for each field in the corpus of documents. The embodiment may also include executing one or more existing query performance prediction (QPP) methods on the retrieved list and each generated PE reference-list. The embodiment may further include deriving one or more extended QPP methods based on the generated PE reference-lists and the retrieved list. The embodiment may also include estimating a performance of the query in obtaining the retrieved list of multifield documents based on the one or more extended QPP methods.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for predicting the performance of a query in retrieving multifield documents. The following described exemplary embodiments provide a system, method, and program product to, among other things, generate a pseudo-effective (PE) reference-list for each field in a corpus of documents and, accordingly, estimate the performance of the query in obtaining a retrieved list of multifield documents based on novel extended (QPP) methods. Therefore, the present embodiment has the capacity to improve the technical field of QPP by creating and comparing reference-lists for better multifield document retrieval.

As previously described, Information Retrieval (IR) is the process of obtaining information system resources that are relevant to an information need from a large collection of those resources. Such resources may include books, journals, and other documents stored in a database. QPP is a core IR task to estimate retrieval effectiveness in the absence of relevance judgments, i.e., human intervention. In many real-world retrieval settings, retrievable documents may be composed of several different fields on which a query is being evaluated, such as title, authors, related work, and question and answer (Q&A) fields. These fields are useful to evaluate in that they may contain the information which a user is seeking. Current QPP methods, such as Clarity, Weighted Information Gain (WIG), and Normalized Query Commitment (NQC), were primarily designed with the assumption that the searched corpus consists of documents with each document having only a single descriptive textual source, i.e., a single field. However, in many real-world settings, documents may contain several fields. It may therefore be imperative to have a system in place to extend existing QPP methods so that these methods can better handle more complex IR tasks. Thus, embodiments of the present invention may provide advantages including, but not limited to, accurately predicting the performance of a query in retrieving relevant multifield documents, handling complex IR tasks in which documents have multiple fields, and analyzing the similarities among single-field reference-lists. The present invention does not require that all advantages need to be incorporated into every embodiment of the invention.

According to at least one embodiment, when a query is received from a user, a list of multifield documents may be retrieved from a corpus of documents in order to generate a PE reference-list for each field in the corpus of documents. As an example, multifield documents may have question and answer fields, as well as fields for title, abstract, introduction, and related works. Upon executing one or more existing QPP methods on the retrieved list of multifield documents and each generated PE reference-list, one or more extended QPP methods may be derived based on the generated PE reference-lists as well as the retrieved list and applied in addition to the one or more existing QPP methods so that the performance of the query in obtaining the retrieved list of multifield documents can be accurately predicted. According to at least one embodiment, the extended QPP method may include deriving similarities between each PE reference-list and the retrieved list of multifield documents. According to at least one other embodiment, the extended QPP method may include deriving intrinsic agreements between each of the generated PE reference-lists.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate a PE reference-list for each field in a corpus of documents and, accordingly, estimate the performance of the query in obtaining a retrieved list of multifield documents based on novel extended QPP methods.

Figure 1:
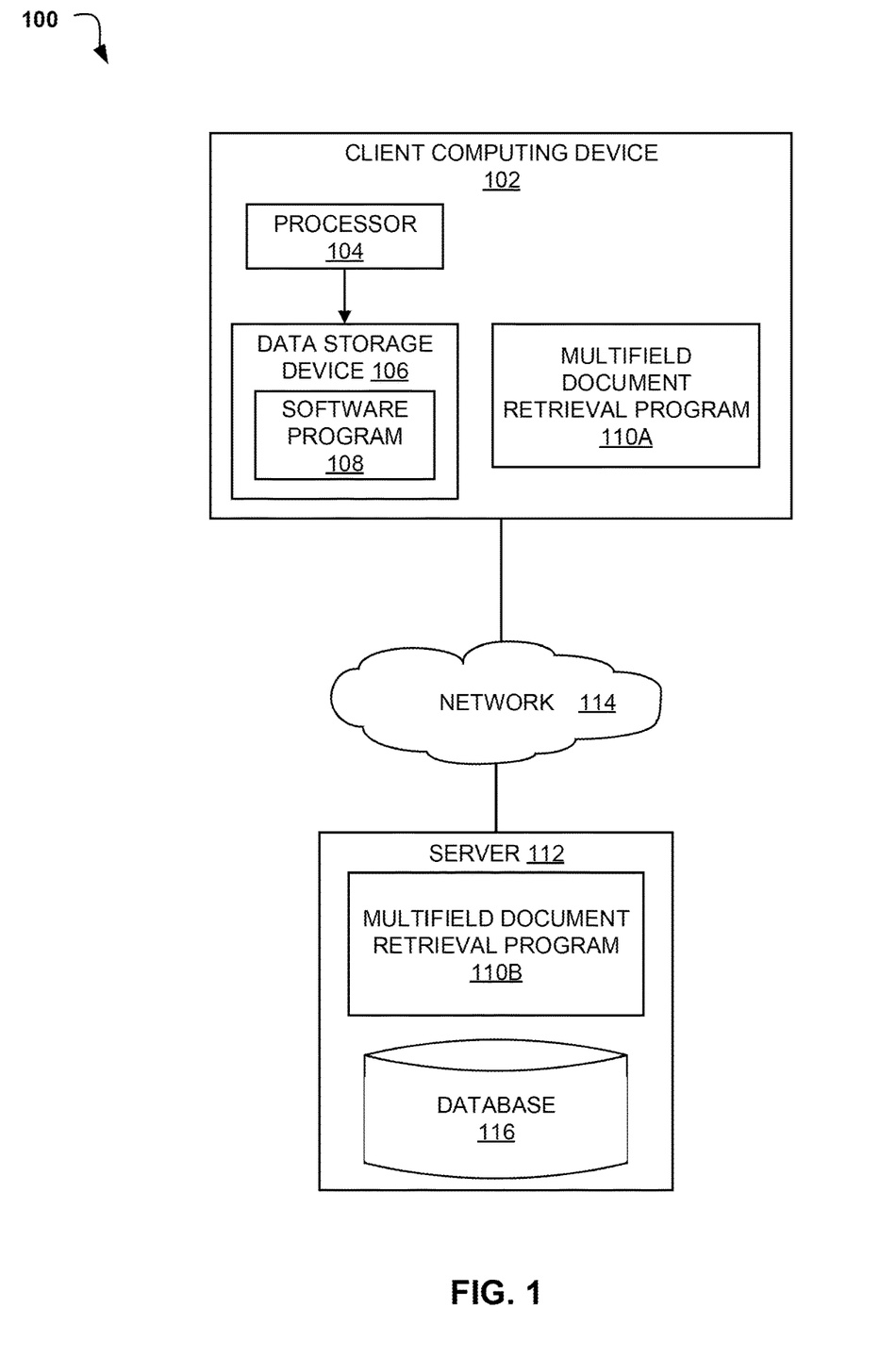
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a multifield document retrieval program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a multifield document retrieval program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the multifield document retrieval program 110A, 110B may be a program capable of receiving a query from a user, retrieving a list of multifield documents from a corpus of documents, deriving one or more extended QPP methods, accurately predicting the performance of a query in retrieving relevant multifield documents, handling complex IR tasks in which documents have multiple fields, and analyzing the similarities among single-field reference-lists. The query performance prediction method in a multifield document retrieval context is explained in further detail below with respect to FIG. 2.

Figure 2:
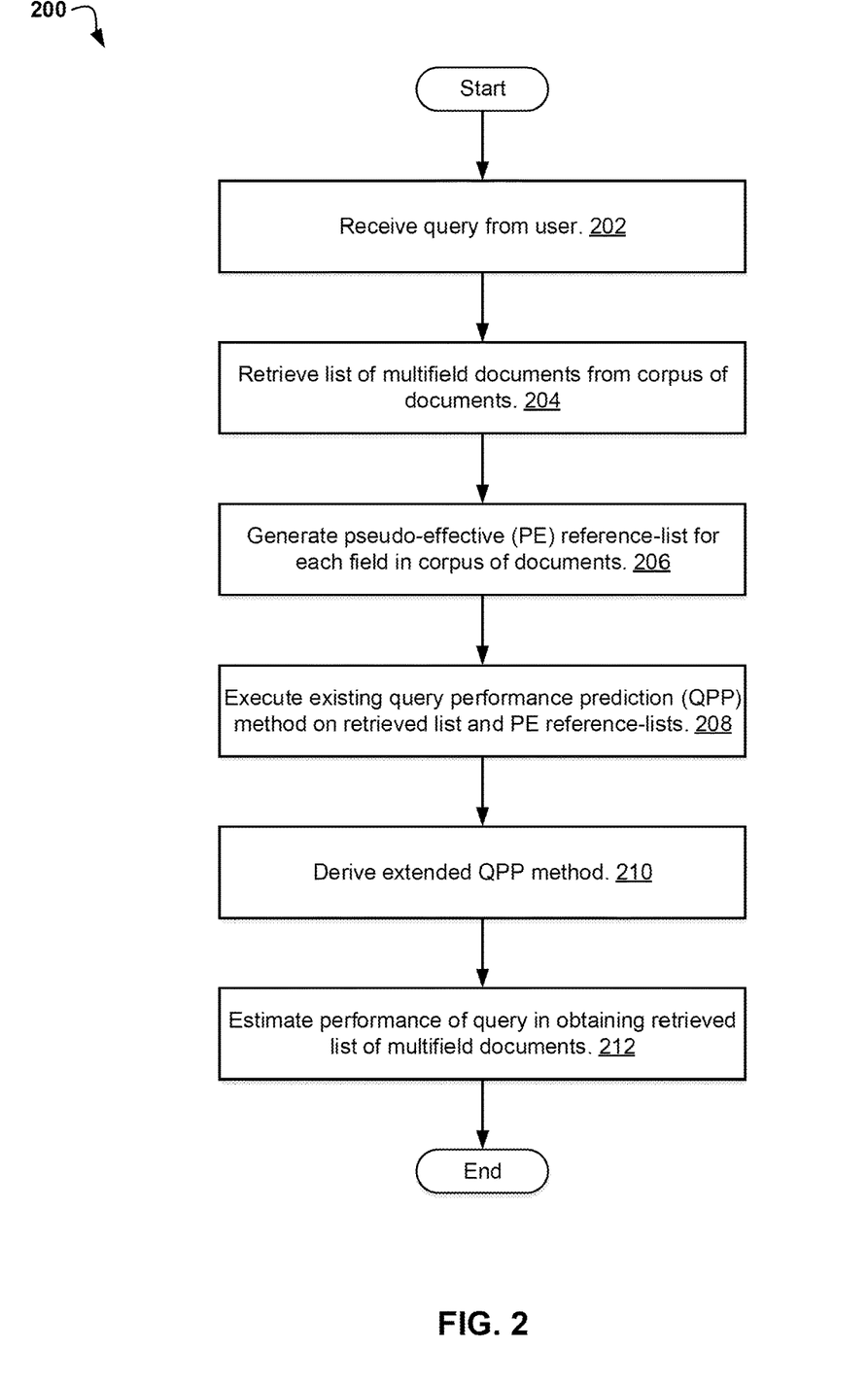
FIG. 2 illustrates an operational flowchart for predicting the performance of a query in retrieving multifield documents in a multifield document retrieval process according to at least one embodiment.

Referring now to FIG. 2, an operational flowchart for predicting the performance of a query in retrieving multifield documents in a multifield document retrieval process 200 is depicted according to at least one embodiment. At 202, the multifield document retrieval program 110A, 110B receives the query from the user. Using the software program 108 on the client computing device 102, the user may submit the query. The query may include a question for which the user is seeking an answer. For example, the query may pertain to a Frequently-Asked-Question (FAQ) setting, a scientific research setting, an ad-hoc relevant table retrieval setting, and any other IR task known to a person of ordinary skill in the art. The multifield documents retrieved in response to the query are described in further detail below with respect to step 204.

Then, at 204, the multifield document retrieval program 110A, 110B retrieves the list of multifield documents from the corpus of documents in response to the query. The retrieved list is obtained by searching the query over multiple fields in the corpus of documents. As described above with respect to step 202, the user may seek to obtain an answer on a particular subject. The retrieved list of multifield documents may include relevant documents pertaining to a particular subject. As used herein, "fields" means textual descriptions in a document on which the query is being searched. For example, in an FAQ retrieval setting, documents usually consist of two fields, i.e., a question field and an answer field. Continuing the example, a query in the Maintenance & Repairs section of the Yahoo!® answers community (Yahoo! and all Yahoo!-based trademarks and logos are trademarks or registered trademarks of Verizon Media and/or its affiliates) may include "How do you change a lightbulb in a car's headlight?" The documents included in the retrieved list of multifield documents may contain two fields, a field for the question, and a field for the answer to the question. In another example, such as in a scientific research setting, the documents included in the retrieved list of multifield documents may contain several fields such as the document's title, authors, abstract, introduction, and related works. Each field in the corpus of documents may be indexed prior to retrieval from the corpus of documents. According to at least one embodiment, the fields may be defined manually by the user and the defined fields may be included in the index. For example, the user may identify the title and the abstract as fields. According to at least one other embodiment, the fields may be indexed automatically using an open source search library, such as the Apache Lucene® open source search library (Apache Lucene and all Apache Lucene-based trademarks and logos are trademarks or registered trademarks of Apache Software Foundation and/or its affiliates).

In the present embodiment, at 206, the multifield document retrieval program 110A, 110B generates the PE reference-list for each field in the corpus of documents. As used herein, "PE reference-list" means a reference-list which is assumed to be a prototype list that exhibits a reasonable retrieval effectiveness. Each PE reference-list may be generated by searching the query over a single field in the corpus of documents. In contrast, as described above, the retrieved list of multifield documents may be obtained by searching the query over multiple fields in the corpus of documents. In embodiments of the present invention, let D denote the corpus of multifield documents, and d denote a single document in D. For a given query q evaluated over D using retrieval model M, let $D_{q,F}^{[k]}$ denote the retrieved list of top-k documents in D having the highest multifield retrieval score $s_{q,F}(d)$ according to M. Continuing the example above, in the FAQ setting, the documents in the retrieved list may have two fields, i.e., a question field and an answer field. In this particular example, two PE reference-lists may be generated, one for the question field and one for the answer field. Thus, given a set of queried document fields $F=\{f_1, f_2, \ldots f_m\}$ where m is the total number of fields, m may also represent the number of PE reference-lists that are generated. The PE reference-lists are described in further detail below with respect to step 210.

Then, at 208, the multifield document retrieval program 110A, 110B executes the one or more existing QPP methods on the retrieved list of multifield documents and each generated PE reference-list. Examples of existing QPP methods include Clarity, Weighted Information Gain (WIG), and Normalized Query Commitment (NQC). Each of these are now discussed in further detail. Let $P(\bullet)$ denote a QPP method. Each existing QPP method may be made aware of multifield document scores.

The NQC method estimates the query's performance according to the standard-deviation of $D_{q,F}^{[k]}$'s document retrieval scores, further normalized by the corpus score $s_{q,F}(D)$, formally:

$$\mathcal{P}_{NQC}(D_{q,F}^{[k]}) \stackrel{def}{=} \frac{\sqrt{\frac{1}{k}\sum_{d \in D_{q,F}^{[k]}}(s_{q,F}(d)-\hat{\mu})^2}}{|s_{q,F}(\mathcal{D})|},$$

where $\hat{\mu}$ denotes $D_{q,F}^{[k]}$'s retrieval score.

The WIG method estimates the query's performance according to the difference between $D_{q,F}^{[k]}$'s mean retrieval score and that of the corpus score $s_{q,F}(D)$, formally:

$$\mathcal{P}_{WIG}(D_{q,F}^{[k]}) \stackrel{def}{=} \frac{1}{k\sqrt{|q|}} \sum_{d \in D_{q,F}^{[k]}} (s_{q,F}(d) - s_{q,F}(\mathcal{D})),$$

where $|q|$ denotes the query's length.

The Clarity method estimates the query's performance according to the divergence between the relevance model R induced from $D_{q,F}^{[k]}$ and that induced from the corpus D which serves as the background model. To apply Clarity, $D_{q,F}^{[k]}$'s calibrated mean multifield retrieval score may be estimated as follows:

$$\mathcal{P}_{Clarity}(D_{q,F}^{[k]}) \stackrel{def}{=} \frac{1}{k} \sum_{d \in D_{q,F}^{[k]}} s_{q,F}(d) \cdot \left[\frac{1}{|d|} \cdot \log \frac{p(d|R)}{p(d|\mathcal{D})}\right],$$

where $|d|$ denotes the overall length of d (i.e., considering all fields), and $p((d|R)$ and $p((d|C)$ denote the generation likelihood of d from the relevance model R and D's model, respectively.

Next, at 210, the multifield document retrieval program 110A, 110B derives the one or more extended QPP methods. The one or more extended QPP methods are based on the PE reference-lists generated above with respect to step 206 and the retrieved list of multifield documents described above with respect to step 204.

At least one extended QPP method uses similarities between each of the generated PE reference-lists and the retrieved list of multifield documents. As described above, the PE-reference-lists may be obtained by searching the query over a single field in the corpus of documents, whereas the retrieved list of multifield documents may be obtained by searching the query over multiple fields in the corpus of documents. Such similarities between each of the generated PE reference-lists and the retrieved list of multifield documents may be derived using known techniques including, but not limited to, natural language processing (NLP). For example, in a scientific research setting, if the documents included in the retrieved list of multifield documents have ten fields, then ten PE reference-lists may be generated, each of which may be compared with the retrieved list of multifield documents. For a given field $f \in F$, let $D_{q,F}^{[k]}$ denote the PE reference-list with the top-k documents having the highest single-field retrieval score $s_{q,F}(d)$, as assigned by M. Given m such PE-reference lists and some basic predictor $P(\bullet)$, the following extended predictor may be derived:

$$P_{MFRL}(D_{q,F}^{[k]}) \stackrel{def}{=} P(D_{q,F}^{[k]})^\lambda \cdot P_{RefList}(D_{q,F}^{[k]})^{1-\lambda}.$$

where $\lambda \in [0,1]$ and $P_{RefList}(D_{q,F}^{[k]})$ is calculated according to reference-list similarity, as follows:

$$\mathcal{P}_{RefList}(D_{q,F}^{[k]}) \stackrel{def}{=} \sum_{f \in F} sim(D_{q,f}^{[k]}, D_{q,F}^{[k]}) \cdot \mathcal{P}(D_{q,F}^{[k]}).$$

Similarity measure $sim(\bullet)$ may be instantiated as the Ranked Biased Overlap (RBO) measure, calculated for a pair of given PE reference-lists $(D_i, D_j)$ as follows:

$$sim_{RBO(p)}(D_i, D_j) \stackrel{def}{=} (1-p) \cdot \sum_{l=1}^{k} \frac{|D_i^{[l]} \cap D_j^{[l]}|}{l} \cdot p^{l-1},$$

where $p \in [0,1]$ is a free parameter.

According to at least one other embodiment, the at least one extended QPP method, in addition to using similarities between each of the generated PE reference-lists and the retrieved list of multifield documents described above, may derive the one or more intrinsic agreements between each of the generated PE-reference lists. The one or more intrinsic agreements may be measured by utilizing a mean inter-list rank-based similarity between each of the generated PE reference-lists. Let $L_F = \{D_{q,F}^{[k]}; f \in F\}$. The intrinsic agreement between the various PE reference-lists in $L_F$ according to mean inter-list rank-based similarity may be measured as follows:

$$\text{Agreement}(L_F) \stackrel{def}{=} \frac{1}{2m(m-1)} \sum_{(f_i, f_j) \in F, i<j} sim\left(D_{q,f_i}^{[k]}, D_{q,f_j}^{[k]}\right),$$

where sim(•) is calculated using the RBO(p) measure. The extended predictor may then be derived by utilizing the agreement measure as a (scaled) regularization term of the PE reference-list based predictor, as follows:

$$P_{MFRLA}(D_{q,F}^{[k]}) \stackrel{def}{=} P_{MFRL}(D_{q,F}^{[k]}) \cdot \text{Agreement}(L_F)^\beta.$$

where $\beta \in [0,1]$ is the scaling parameter.

In the present embodiment, at 212, the multifield document retrieval program 110A, 110B estimates the performance of the query in obtaining the retrieved list of multifield documents. The estimated performance of the query is based on the one or more extended QPP methods described above with respect to step 210, which may be applied in addition to the one or more existing QPP methods. If the estimated performance of the query in retrieving relevant multifield documents is below a threshold level, e.g., 50% or less chance of an effective retrieval, a remedial action may be suggested to the user, such as modifying the query for a more effective retrieval.

It may be appreciated that FIG. 2 provides only an illustration of one implementation and does not imply any limitations with regard to how different embodiments may be implemented. Many modifications to the depicted environments may be made based on design and implementation requirements.

Figure 3:
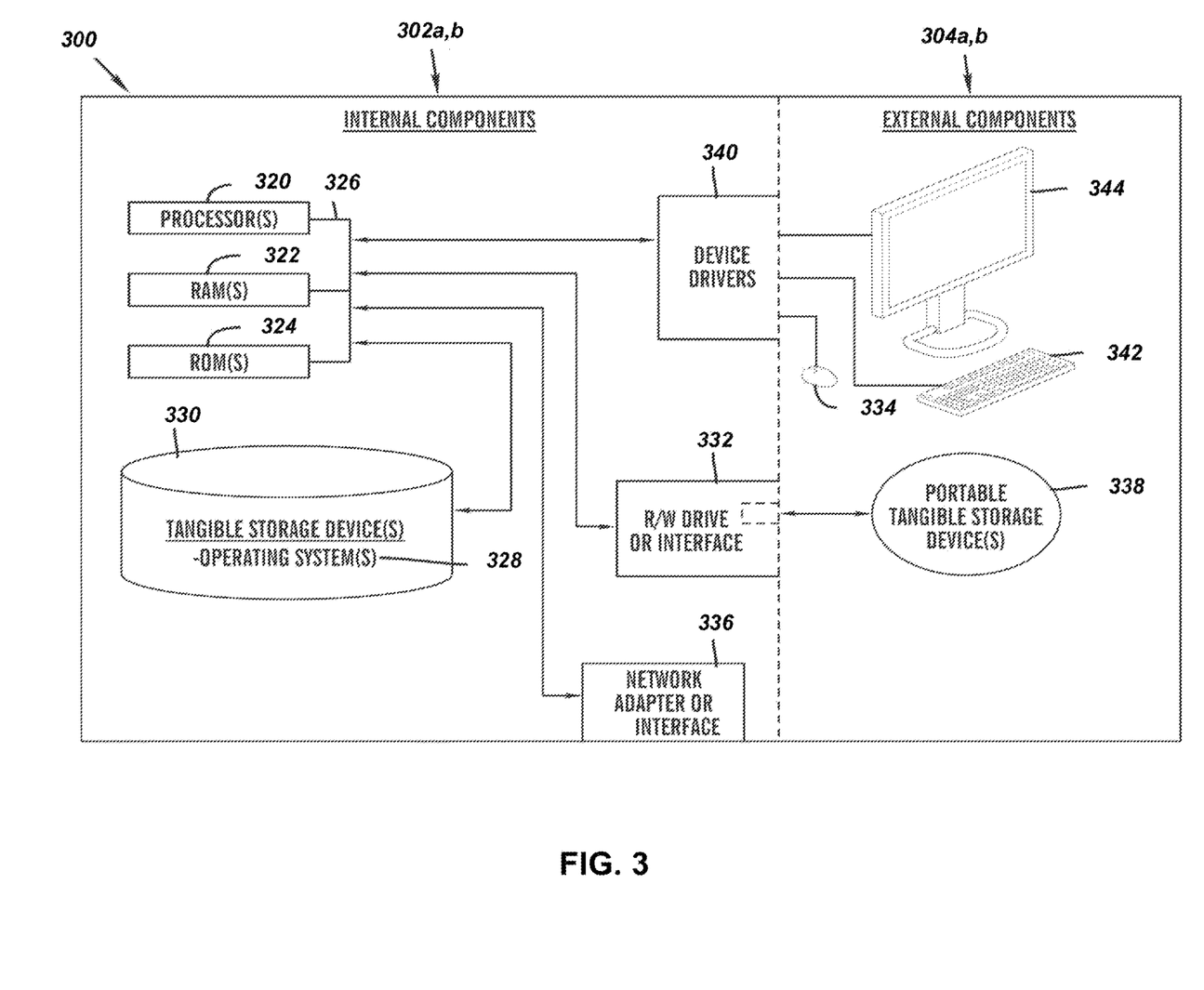
FIG. 3 is a functional block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the multifield document retrieval program 110A in the client computing device 102 and the multifield document retrieval program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the multifield document retrieval program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the multifield document retrieval program 110A in the client computing device 102 and the multifield document retrieval program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the multifield document retrieval program 110A in the client computing device 102 and the multifield document retrieval program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
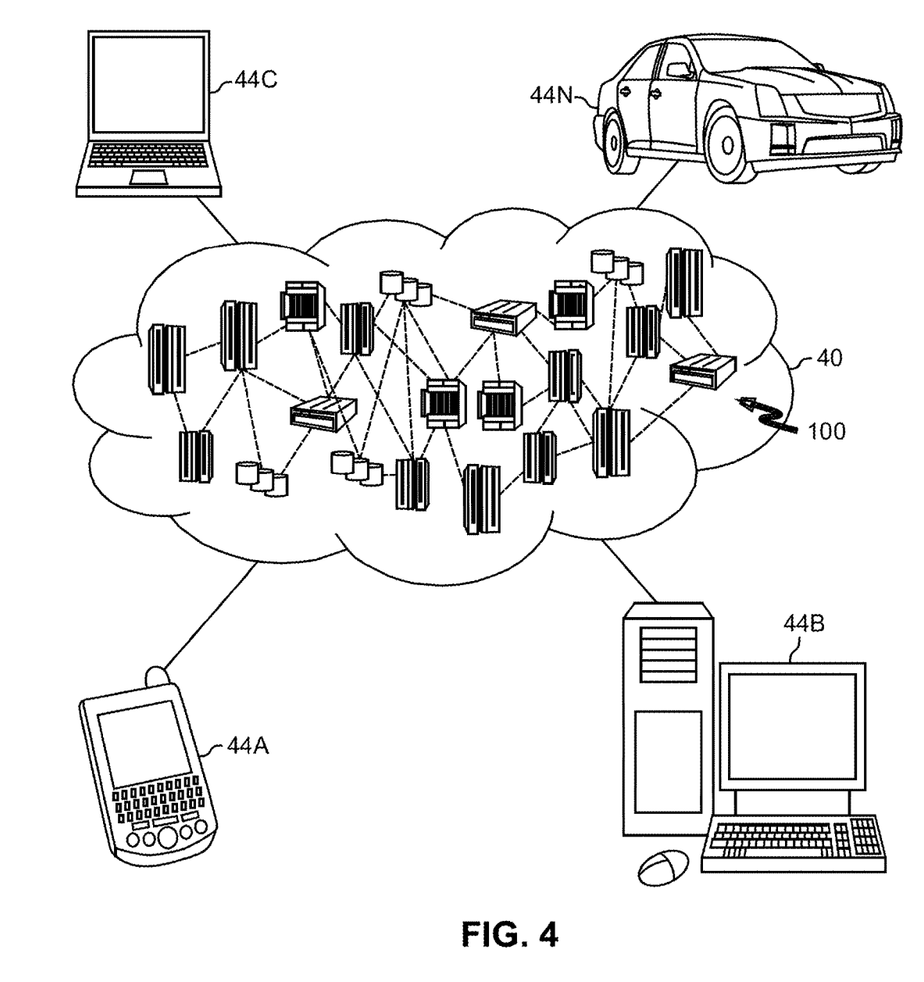
FIG. 4 depicts a cloud computing environment according to an embodiment of the present invention.

Referring now to FIG. 4, illustrative cloud computing environment 40 is depicted. As shown, cloud computing environment 40 comprises one or more cloud computing nodes 100 with which local computing devices used by cloud consumers, such as, for example, personal digital assistant (PDA) or cellular telephone 44A, desktop computer 44B, laptop computer 44C, and/or automobile computer system 44N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 100 and cloud computing environment 40 can communicate with any type of computerized device over any type of network and/or network addressable connection (e.g., using a web browser).

Figure 5:
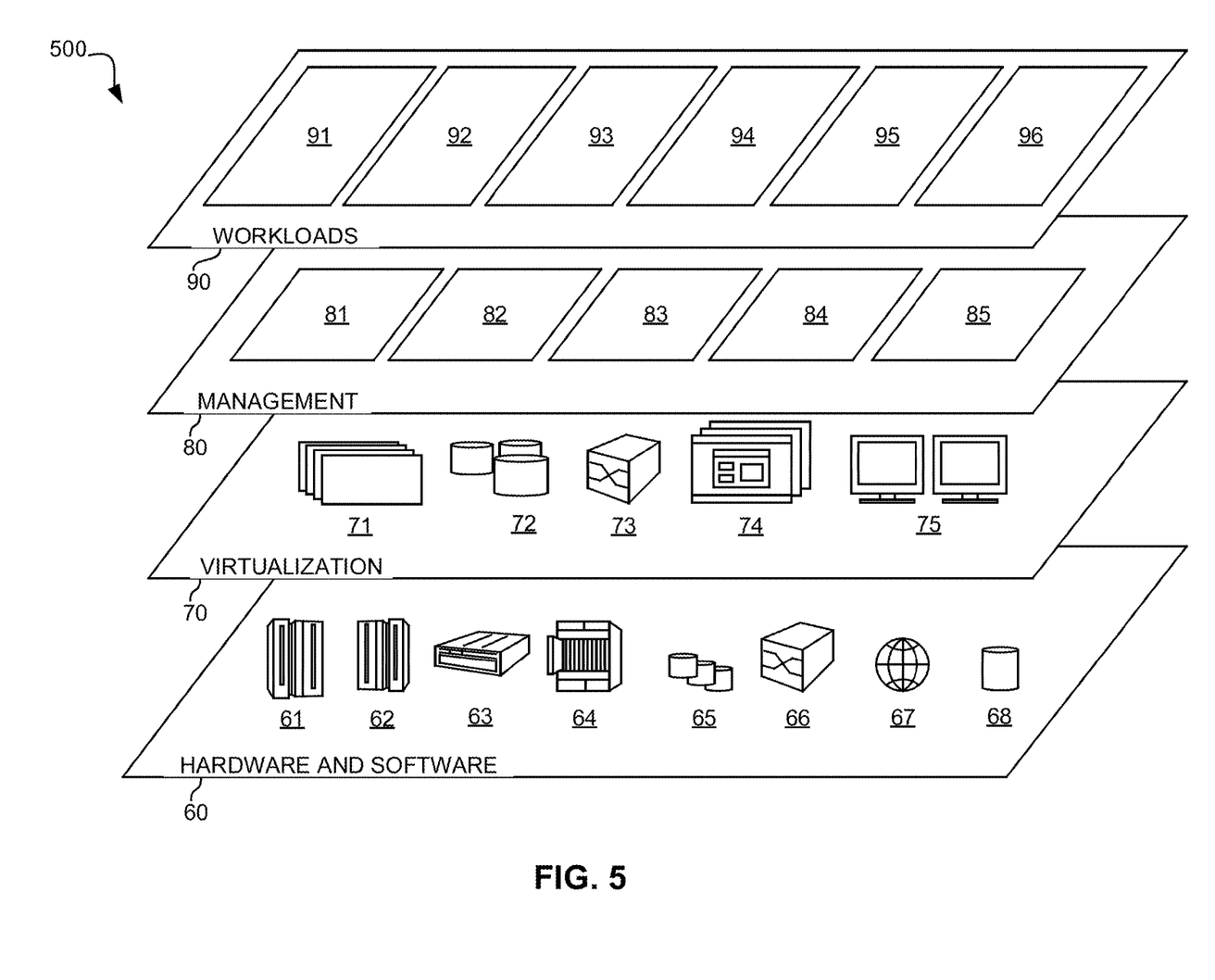
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query performance prediction in multifield document retrieval 96. Query performance prediction in multifield document retrieval 96 may relate to generating a PE reference-list for each field in a corpus of documents in order to estimate the performance of the query in obtaining a retrieved list of multifield documents based on novel extended QPP methods.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of predicting a performance of a query in retrieving multifield documents, the method comprising:
   receiving a query from a user;
   retrieving a list of multifield documents from a corpus of documents in response to the query, wherein the retrieved list is obtained by searching the query over multiple fields in the corpus of documents;
   generating a pseudo-effective (PE) reference-list for each field in the corpus of documents;
   executing one or more existing query performance prediction (QPP) methods on the retrieved list and each generated PE reference-list;
   deriving one or more extended QPP methods based on the generated PE reference-lists and the retrieved list; and
   estimating a performance of the query in obtaining the retrieved list of multifield documents based on the one or more extended QPP methods.

2. The method of claim 1, wherein each field in the corpus of documents is indexed prior to retrieval from the corpus of documents.

3. The method of claim 1, wherein each PE reference-list is generated by searching the query over a single field in the corpus of documents.

4. The method of claim 1, wherein at least one extended QPP method comprises:
   deriving one or more similarities between each generated PE reference-list and the retrieved list of multifield documents.

5. The method of claim 4, wherein the at least one extended QPP method further comprises:
   deriving one or more intrinsic agreements between each of the generated PE reference-lists.

6. The method of claim 5, wherein the one or more intrinsic agreements are measured by utilizing a mean inter-list rank-based similarity between each of the generated PE reference-lists.

7. The method of claim 1, wherein the existing QPP method is selected from a group consisting of Clarity, Normalized Query Commitment (NQC), and Weighted Information Gain (WIG).

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving a query from a user;
   retrieving a list of multifield documents from a corpus of documents in response to the query, wherein the retrieved list is obtained by searching the query over multiple fields in the corpus of documents;
   generating a pseudo-effective (PE) reference-list for each field in the corpus of documents;
   executing one or more existing query performance prediction (QPP) methods on the retrieved list and each generated PE reference-list;
   deriving one or more extended QPP methods based on the generated PE reference-lists and the retrieved list; and
   estimating a performance of the query in obtaining the retrieved list of multifield documents based on the one or more extended QPP methods.

9. The computer system of claim 8, wherein each field in the corpus of documents is indexed prior to retrieval from the corpus of documents.

10. The computer system of claim 8, wherein each PE reference-list is generated by searching the query over a single field in the corpus of documents.

11. The computer system of claim 8, wherein at least one extended QPP method comprises:
    deriving one or more similarities between each generated PE reference-list and the retrieved list of multifield documents.

12. The computer system of claim 11, wherein the at least one extended QPP method further comprises:
    deriving one or more intrinsic agreements between each of the generated PE reference-lists.

13. The computer system of claim 12, wherein the one or more intrinsic agreements are measured by utilizing a mean inter-list rank-based similarity between each of the generated PE reference-lists.

14. The computer system of claim 8, wherein the existing QPP method is selected from a group consisting of Clarity, Normalized Query Commitment (NQC), and Weighted Information Gain (WIG).

15. A computer program product, the computer program product comprising:

one or more computer-readable tangible storage medium and program instructions stored on at least one of the one or more tangible storage medium, the program instructions executable by a processor capable of performing a method, the method comprising:

receiving a query from a user;

retrieving a list of multifield documents from a corpus of documents in response to the query, wherein the retrieved list is obtained by searching the query over multiple fields in the corpus of documents;

generating a pseudo-effective (PE) reference-list for each field in the corpus of documents;

executing one or more existing query performance prediction (QPP) methods on the retrieved list and each generated PE reference-list;

deriving one or more extended QPP methods based on the generated PE reference-lists and the retrieved list; and estimating a performance of the query in obtaining the retrieved list of multifield documents based on the one or more extended QPP methods.

16. The computer program product of claim 15, wherein each field in the corpus of documents is indexed prior to retrieval from the corpus of documents.

17. The computer program product of claim 15, wherein each PE reference-list is generated by searching the query over a single field in the corpus of documents.

18. The computer program product of claim 15, wherein at least one extended QPP method comprises:

deriving one or more similarities between each generated PE reference-list and the retrieved list of multifield documents.

19. The computer program product of claim 18, wherein the at least one extended QPP method further comprises:

deriving one or more intrinsic agreements between each of the generated PE reference-lists.

20. The computer program product of claim 19, wherein the one or more intrinsic agreements are measured by utilizing a mean inter-list rank-based similarity between each of the generated PE reference-lists.

* * * * *